United States Patent [19]

Desmond et al.

[11] 4,164,131
[45] Aug. 14, 1979

[54] AUTOMOBILE ANTI-THEFT DEVICE

[76] Inventors: John W. Desmond, 104 Walter Dr., Media, Pa. 19063; Frank DiFerdinando, 1200 West Chester Pike, West Chester, Pa. 19380

[21] Appl. No.: 905,952

[22] Filed: May 15, 1978

[51] Int. Cl.² ............................................. E05B 73/00
[52] U.S. Cl. ..................................................... 70/14
[58] Field of Search ...................... 180/114; 70/14, 18, 70/19, 225, 237, 57, 15, 1

[56] References Cited

U.S. PATENT DOCUMENTS

| Re. 24,712 | 10/1959 | Marugg | 70/225 |
|---|---|---|---|
| 1,408,133 | 2/1922 | Ochs et al. | 70/18 |
| 1,495,883 | 5/1924 | Chadwick et al. | 70/18 |
| 1,508,547 | 9/1924 | Gentle et al. | 70/18 |
| 1,515,097 | 11/1924 | Dickson | 70/18 |
| 1,548,584 | 8/1925 | Dietrich | 70/19 |
| 1,984,677 | 12/1934 | Harrington | 70/18 X |
| 2,844,954 | 7/1958 | Marugg | 70/225 |
| 2,960,857 | 11/1960 | Winter | 70/19 |
| 3,504,405 | 4/1970 | Elliott-Smith | 70/14 X |
| 3,828,590 | 8/1974 | Thiebault | 70/19 |

FOREIGN PATENT DOCUMENTS

| 371514 | 3/1923 | Fed. Rep. of Germany | 70/18 |
|---|---|---|---|
| 441460 | 11/1948 | Italy | 70/18 |
| 175600 | 5/1935 | Switzerland | 70/14 |

Primary Examiner—Joseph F. Peters, Jr.
Assistant Examiner—Milton L. Smith
Attorney, Agent, or Firm—Woodcock, Washburn, Kurtz & Mackiewicz

[57] ABSTRACT

An anti-theft device of the type which clamps upon an auto tire for resisting rotation of the tire. The clamp is formed of a pair of pivoting arms which may be manually closed upon opposite sides of a tire. Locking means are provided to secure the clamp and prevent unauthorized removal.

11 Claims, 8 Drawing Figures

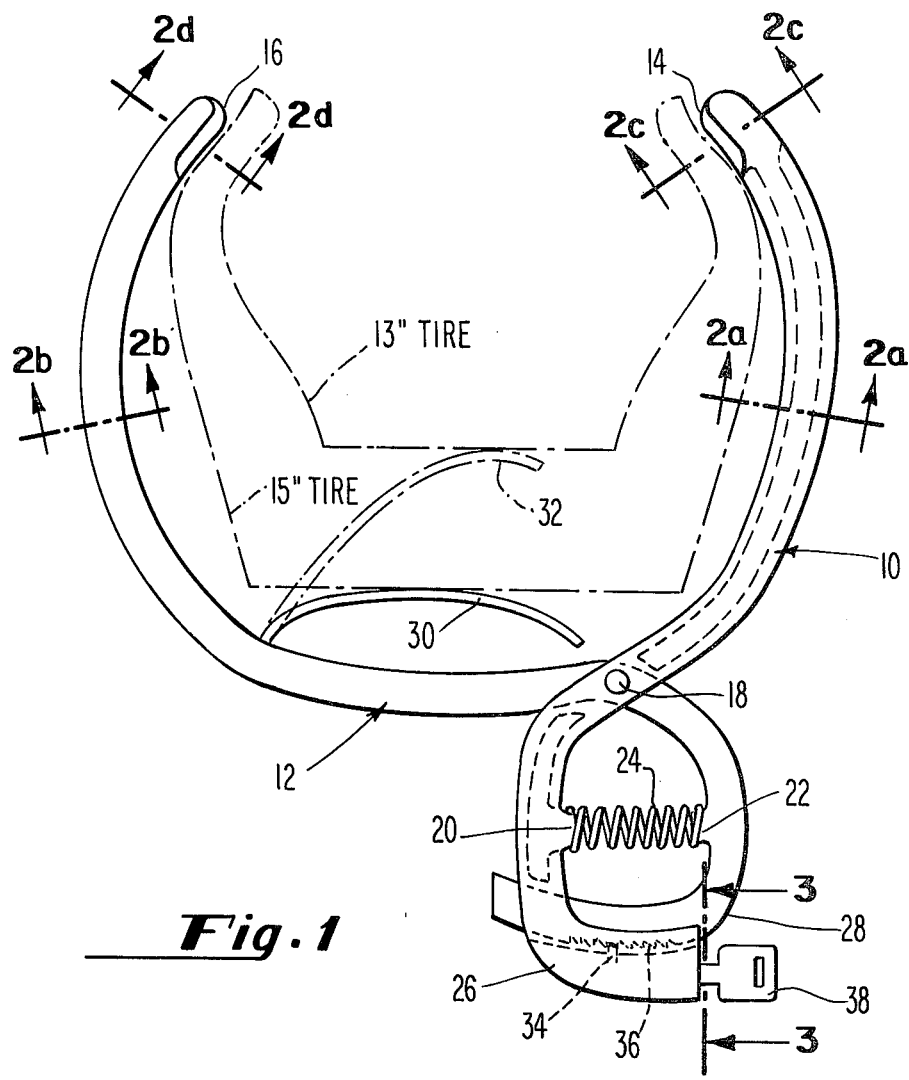
Fig. 1
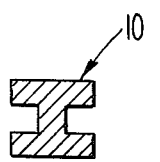
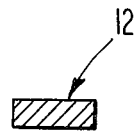
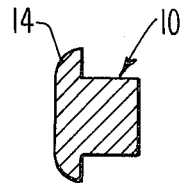
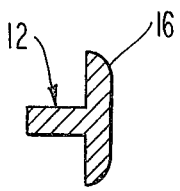
Fig. 2a    Fig. 2b    Fig. 2c    Fig. 2d

AUTOMOBILE ANTI-THEFT DEVICE

BACKGROUND OF THE INVENTION

From the time automobiles first achieved a measure of popularity, efforts were made to prevent or discourage theft of the vehicles. While automotive vehicles are conventionally secured by means of lockable ignition switches, electrically bypassing or "jumping" such mechanisms is easily accomplished.

Other approaches have included locks for the transmission, steering, and other vehicle controls, but all of the economically manufactured versions of such designs can be defeated with relative ease.

It is generally conceded that it is impossible to absolutely secure a vehicle against an intruder who is prepared with the necessary tools for defeating a security system, and who is afforded the time necessary to do so. If it is then granted that a vehicle cannot be perfectly secured, it is then desirable to provide a level of security which, as a practical matter, cannot be easily defeated in a short period of time.

Accordingly, various accessory anti-theft devices have been developed to provide a second time-consuming obstacle to a would-be thief. One species of such accessories is the wheel lock or "boot" which generally takes the form of a mechanical device adapted to be clamped about an automobile wheel for preventing or hindering rotation of the wheel. In this manner, should the factory-installed security system of the vehicle be defeated it will be impossible or extremely difficult to drive the vehicle owing to the boot attached to the wheel thereof.

Although the basic idea of providing such an accessory is an attractive one, to date such accessories have not found widespread acceptance. This is believed in large part due to their normally heavy construction and rather high cost. A further, and also substantial, reason is believed to be the fact that it is often awkward and difficult to apply such accessories, and even more difficult to release them owing to the fact that they are generally placed beneath the vehicle, often within or beneath a fender.

It will therefore be seen that it would be desirable to provide an anti-theft device for automotive vehicles which is easily manufactured, is strong, and is both easily applied and released.

It is therefore an object of the present invention to provide an improved automotive vehicle security device of the clamp-on type.

Another object of the invention is to provide an improved, clamp-on security device which may be operated with only one hand.

Yet another object is to provide a security clamp-on device which clamps directly upon the sidewalls of the tire of a vehicle.

Yet another object is to provide a security device of the clamp-on type which will automatically accommodate a wide variety of tire and wheel sizes.

BRIEF DESCRIPTION OF THE DRAWINGS

These and other objects of the present invention will be better understood from the following description of a preferred embodiment, taken in conjunction with the accompanying drawings in which:

FIG. 1 is a plan view of the present invention illustrating how it may be installed upon an automotive vehicle tire;

FIGS. 2a through 2d are sections taken at 2a—2a through 2d—2d, respectively;

SUMMARY OF THE INVENTION

Figure 3:
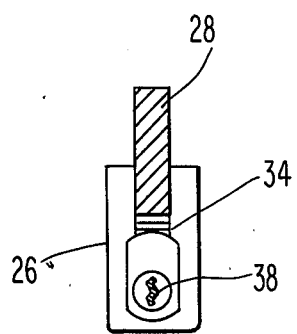
FIG. 3 is a view taken at 3—3 of FIG. 1.

Briefly stated, the present invention includes a clamp formed of a pair of intersecting clamping arms, each arm having a generally S-shape defined by a pair of curved sections of unequal size. One of the arms has an aperture between the curved sections and receives the other arm therethrough, a pivot pin or the like securing the arms together. The upper ends of the arms are adapted to clamp directly against the sidewalls of a vehicle tire, while the lower ends slide together and lock. In a preferred embodiment the lower end of one arm has a cross-section of a channel or U-shape, and receives the lower end of the other arm. A pawl extends into the channel and cooperates with ratchet teeth on the slidably-received arm end to hold it in place. A coil spring or the like is used to bias the members apart, so that when the pawl is released the arms automatically disengage from the sidewalls of the tire.

A preferred embodiment also includes a leaf spring attached to one of the arms and extending inwardly so as to bear directly upon the tread of a tire. In addition, one or both of the upper ends of the arms are provided with pivoted, spring-biased pads to allow for "slack" in the locking ratchet.

DESCRIPTION OF A PREFERRED EMBODIMENT

FIG. 1 is a plan view of a presently-preferred embodiment of the invention, illustrating the manner of its use and cooperation with a vehicle tire. The device generally comprises a pair of pivotally connected arms 10 and 12 which have tire-contacting pads 14 and 16 at their upper ends. Considering arm 10, said arm is formed in a generally S-shape and comprises a first, larger curved section which lies above the pivot point of the arm, and a second, smaller curved section lying below said point. The curvatures of the larger and smaller sections are reversed with respect to one another.

In like manner, clamping arm 12 may be considered to define a generally S-shape and includes a larger curved section, disposed above the pivot point, and a smaller curved section therebelow. As was the case with clamping arm 10 the curvatures of the larger and smaller sections of arm 12 are reversed with respect to one another.

From an inspection of the drawing it will be apparent that the larger curved sections are formed so as to span the carcass of a vehicle tire of the type conventionally used upon a passenger automobile or the like. The lower portions of the arms, defined by the smaller curved sections thereof, are of such a size and span as to be conveniently gripped by the hand of a user. In this manner by firmly grasping the lower curved sections of arms 10 and 12 and squeezing them together, the upper or larger sections may be caused to advance toward one another and close upon the sidewalls of a tire as shown in the Figure.

Arms 10 and 12 intersect at a pivot point defined by a pin 18 or the like. In a presently preferred embodiment a pair of bosses 20, 22 are formed upon the inner edges of the smaller curved sections of arms 10 and 12, respectively, and serve to locate a coil spring 24. The coil spring biases the smaller curved sections apart, thus tending to maintain the upper ends of the arms in a spread or "open" position.

The lowermost ends of the smaller curved sections of arms 10 and 12 slidingly engage one another. Specifically, the lowermost end of arm 10 may be provided with a generally channel-shaped portion 26, into which is received the lower edge of end portion 28 of arm 12. As will be discussed hereinafter, this construction provides increased strength and integrity to the structure. Finally, a spring member 30 is affixed to the larger curved section of clamping arm 12, and in an unstressed condition extends inwardly of the clamping arms, as shown in phantom form at 32.

While the general configurations of clamping arms 10 and 12 are similar, the manner in which each is formed is of considerable importance in providing a light, strong, yet readily manufacturable structure. In particular, clamping arm 10 is substantially thicker than arm 12, and is provided with an aperture for receiving arm 12 therethrough. Considering now FIG. 2a, a typical transverse cross-section of arm 10 is shown wherein an I-beam like construction is utilized. The central web of the I-beam construction is represented by the dotted lines extending within the larger and smaller curved sections of arm 10 in FIG. 1. In particular, the central web of the I-beam structure is interrupted in the area between the large and small curved sections of clamping arm 10, thereby forming an opening through which arm 12 may be passed. Regarding FIG. 2b, it will be seen that the transverse thickness of arm 12 is approximately the same as the thickness of the central web or arm 10, allowing arm 12 to be passed through arm 10 and subsequently pivotally attached to it by means such as pin 18. The web of arm 10 terminates above the U-shaped, lowermost portion of arm 10 to form a second aperture which slidably receives the lowermost end 28 of arm 12.

FIGS. 2c and 2d illustrate the transverse cross-sections of the uppermost, distal ends of clamping arms 10 and 12, respectively. In the illustrated embodiment pads 14 and 16 are integrally formed with the arm structure, and provide broad lateral surfaces which assist in maintaining the device in position upon a vehicle tire.

To attach the present invention to the tire of an automobile or the like, a user simply grasps the lower sections of arms 10 and 12 and squeezes them together. The device is normally in the open position, i.e., the upper sections of arms 10 and 12 are spread apart by spring 24. This permits the device to pass over the bulged portion of the tire. Squeezing the lower sections together closes the upper ends firmly around the sidewall of the tire. At this time, a spring-loaded pawl 34 is automatically secured and engages ratchet teeth 36, thus protecting the automobile from theft.

Due to the construction of the present device, vehicle tires of considerably different sizes may be accommodated yet without sacrificing any of the effectiveness of the invention. For instance, if a small, e.g. 13" tire, is involved the opposed pads 14, 16 must be brought somewhat closer together to clamp tightly upon the tire sidewalls. In addition, spring arm 30 is deflected slightly outwardly and presses against the tread of the tire. The spring arm thus serves to hold the device firmly outwardly from the tire. In effect, the spring arm 30 takes up radial "slack," while the transverse differential in size is accommodated by the relative movement of arms 10 and 12.

In the event a large (e.g. 15") tire is involved, the clamping arms simply close to a lesser degree before encountering the sidewalls of the tire. Spring arm 30 is again deflected as it encounters the tread of the tire, and serves as before to take up the radial "slack" and to bias the device radially outwardly from the tire. It will now be understood that the present invention will accommodate a widely varying range of tire sizes, yet without any attendant looseness which would practically destroy the effectiveness of the device.

FIG. 3 illustrates an end view of the locking mechanism used in one presently preferred embodiment of the invention. As discussed above, the lowermost end 26 of arm 10 is formed in a U-shaped or channel configuration, and slidingly receives the lowermost end 28 of clamping arm 12. In the embodiment illustrated, and as shown in FIG. 1, the locking means comprises a spring-loaded pawl 34 which is biased upwardly by a spring (not shown) and which engages ratchet teeth 36 formed at the lowermost edge of end portion 28. By inserting a proper key 38 into the lock and turning the key, the pawl can be withdrawn and the ratchet teeth released, whereupon spring 24 urges the clamping arms apart and releases the vehicle tire. In this manner it will be understood that engagement and disengagement of the present invention is easily accomplished, an important factor inasmuch as most vehicle tires are at least partially surrounded by fenders, fender wells, and the like and therefore access to the tire periphery is difficult.

It will now be appreciated that use of the present invention does not require that a user get down on his hands and knees, or to reach far beneath a vehicle, in order to install the device. As referred to above, arms 10 and 12 are asymmetrical and are pivoted at an off-center position so that the lower curved sections which form the handgrip portion thereof are displaced toward one side of the tire. This considerably lessens the distance that a user has to reach in applying the device to a vehicle tire.

It will be seen that the present device may be both applied and released by a user with only one hand, due in part to the asymmetrical aspect of its construction and to the bias provided by spring 24. It may be, however, that in some instances an integral locking mechanism is not desired or is deemed uneconomical. Such might be the case, for instance, where the device is to be used upon construction equipment or trucks wherein access to a tire is not a problem. In such an instance the construction of FIG. 4 may be adopted.

Figure 4:
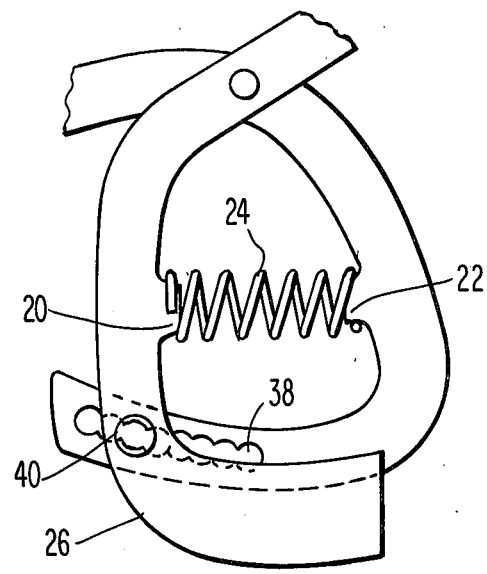
FIG. 4 discloses an alternate embodiment of one aspect of the invention.

In FIG. 4 there is shown the lowermost sections 26 and 28 of arms 10 and 12, respectively. As before, portion 26 is provided with a channel or U-shape so as to enclose at least the lowermost edge of section 28. A series of overlapping holes 38 is formed in section 28, and defines a set of positions in which the clamping arms may be locked. A hole 40 is bored transversely through lower section 26 of arm 10, and is aligned with one of holes 38 in the manner shown.

When the clamping arms are applied to opposite sides of a vehicle tire, and the lower curved sections squeezed together to cause the upper ends to tightly engage the tire sidewalls, a locking device such as a padlock may be passed through hole 40 to prevent subsequent motion of the clamping arms with respect to one another. When the padlock or other device is removed, the arms are once more free to move apart and the device may be released from the tire.

Figure 5:
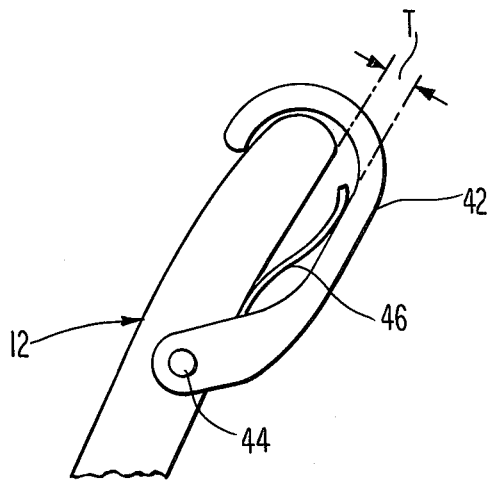
FIG. 5 illustrates a modification of the embodiment of FIG. 1.

Despite the fact that vehicle tires exhibit some degree of resiliency, it is anticipated that the coarseness of the ratchet teeth 34 (or equivalently, of holes 38) will be limited in order to provide the necessary strength. Accordingly, one embodiment of the invention includes a spring-loaded pad disposed at the uppermost end of one or both of the clamping arms. As illustrated in FIG. 5, a rigid pad 42 is pivotally coupled to the upper end of arm 12 by means of a pivot pin 44 or the like. Spring means 46, which may be an appropriately-curved leaf spring, is interposed between arm 12 and pad 42 for the purpose of biasing the pad inwardly against the side of a tire. The movement or throw T of the pad is preferably equivalent to the distance traveled by the upper end of arm 12 from one clamping position to the next, and is therefore a function of the coarseness of holes 38 or ratchet teeth 36. It should be understood that the provision of the spring-loaded pad 42 simply serves as an aid in maintaining the present device in position upon a vehicle tire, since the bulge of the tire sidewall will prevent removal of the device from the tire body even if the clamping arms are not in tight engagement with the tire sidewall.

A further advantage inheres in the illustrated construction of the lowermost ends of the clamping arms. By causing the lower end 26 of arm 10 to form a channel, and receiving therein the lower edge of arm 12, access to the lower edge is prevented. Accordingly, there is no point on the structure which provides a purchase for prying the lower ends apart and disengaging the ratchet or similar locking device. Upward pressure upon the remote end of arm 12, which has passed through an aperture in arm 10, will serve no purpose since the aperture securely holds the free end of arm 12 in place.

In like manner, a purchase cannot be had for prying the end of arm 12 directly above the key slot of portion 26. In this manner the U- or channel shaped construction of arm 10 makes the device virtually burglar-proof, yet without adding substantially to the mass and weight of the device.

It will now be understood that the present invention provides a superior means for preventing or inhibiting the rotation of a vehicle tire, and moreover one which is more economically manufactured and more easily installed than any known in the prior art. Accordingly, and as will be evident from the foregoing description, certain aspects of the invention are not limited to the particular details of the examples illustrated and it is therefore contemplated that other modifications or applications will occur to those skilled in the art. It is therefore intended that the appended claims shall cover all such modifications and applications as do not depart from the true spirit and scope of the invention.

What is claimed as new and desired to be secured by Letters Patent of the United States is:

1. A vehicle anti-theft device for lockably gripping a vehicle tire from either side thereof in order to hinder or prevent the rotation of said tire, comprising:
    first and second clamping arms, each arm having a larger curved section and a smaller curved section, said smaller section being curved in a direction opposite to said larger section;
    one of said arms having an aperture formed between the larger and smaller sections thereof, the other of said arms extending through said aperture;
    pivot means extending through said aperture and through both of said arms to allow said arms to pivot relative to one another;
    the distal end of one of said smaller sections defining a channel;
    the distal end of the other of said smaller sections having an edge slidably disposed in said channel, whereby said last-named distal end slides in said channel when said arms pivot with respect to one another; and
    means adjacent said channel to enable the locking of said last-named lower end in said channel.

2. A device according to claim 1, further including spring means having one end fixedly attached to the larger curved section of one of said arms and extending away from said pivot means for exerting pressure upon the tread portion of a vehicle tire to cause said clamp to extend generally radially outwardly from said tire.

3. A device according to claim 1, further including second spring means extending between said smaller sections of said arms for biasing said smaller sections apart.

4. A device according to claim 3, further including locking means comprising a pawl extending inwardly of said channel, and said last-named lower distal end defines a series of teeth for engaging said pawl.

5. A device according to claim 3, wherein said last-named distal end defines a series of closely-placed holes therein for receiving the hasp of a padlock.

6. A device according to claim 1, further including a pad pivotally coupled to the distal end of the larger curved section of one of said arms.

7. An anti-theft device for automotive vehicles of the type which hinders or prevents rotation of a wheel thereof, comprising:
    first and second clamping arms having upper ends adapted to clamp tightly against the opposing sidewalls of a tire, each of said arms having a larger curved section and an adjacent, smaller oppositely-curved section;
    said first arm having a first aperture generally intermediate said larger and smaller sections thereof, said second arm extending through said first aperture so that said arms intersect at a point between the larger and smaller sections thereof;
    pivot means disposed adjacent the intersection of said arms;
    the end of said second arm adjacent said smaller section being slidably received in the corresponding end of said first arm;
    locking means for selectively preventing the ends of said second arm from moving relative to the ends of said first arm;
    said arms being non-symmetrical such that the smaller sections thereof are substantially offset with respect to the larger sections to facilitate manual application and removal of the device from the tire of an automotive vehicle.

8. A device according to claim 7, wherein said locking means comprises a spring-loaded ratchet pawl, and a key-operated lock therefor.

9. Apparatus according to claim 8, further including spring means for biasing said smaller sections apart.

10. Apparatus according to claim 9, further including a pad pivotally coupled to the distal end of the larger section of one of said clamping arms; and spring means disposed between said pad and said clamping arm, the pad being capable of sufficient movement to compensate for increments of said ratchet.

11. Apparatus according to claim 9, further including a leaf spring having one end fixedly coupled to one of said arms and the other end extending away from said pivot pin for contacting the tread portion of a vehicle tire, said spring having sufficient throw to achieve firm contact with the tread surfaces of tires of disparate sizes.

* * * * *